Aug. 1, 1939.   F. W. HOCH   2,167,652
METHOD OF TESTING FOR INK REQUIREMENTS
Filed June 19, 1936

INVENTOR.
Fred W. Hoch
by C. P. Goepel
his ATTORNEY.

Patented Aug. 1, 1939

2,167,652

UNITED STATES PATENT OFFICE 2,167,652

METHOD OF TESTING FOR INK REQUIREMENTS

Fred W. Hoch, Forest Hills, N. Y.

Application June 19, 1936, Serial No. 86,203

2 Claims. (Cl. 73—51)

This invention has for its object to determine the coverage of inks, paints, or the like, by means of a system of marking, whereby printers or painters can ascertain from the labels on the cans the coverage of the contents thereof, and determine the amount of ink or paint of a given film thickness, necessary for any particular job, without any further or special tests.

The invention has also for its object to provide a method of ascertaining the coverage of any ink or paint in order to either test the contents of a can or container as to coverage or, independently thereof, to test any kind of ink or paint from whatever source derived in order to determine its coverage and other qualities such as for color and drying on various kinds of paper stock.

Printing ink, for instance, is now bought by the printer at pound rate and sold to customers by coverage indicated by the area of paper stock covered by the ink during the printing operation. There is, necessarily, much uncertainty in estimating printing ink requirements to provide for the proper amount of ink to be consumed on a given job. It is known that inks of a strong tintorial value require less film thickness to print a given color requirement than do inks with weak tintorial value. This general principle of ink evaluation gives the printer a factor for determining ink requirements indicated by the difference expressed by specific gravity, which controls the bulk or entire contents of one pound of ink.

A round tube of approximately one square inch area would have a diameter of 1.12837916 inches, and would present with approximately one inch depth of said tube, one cubic inch of ink content. As a round tube has been referred to which implies a base formed by a circle, and as no attempt is made to square a circle, the figure 1.12837916 is the nearest factor to enable the calculations to be carried out. Hence, a tube of ink of inside diameter of 1.12837916 inches would contain as many cubic inches as the length of the tube itself represents. The coverage of the content of a twelve-cubic inch tube or can, would be twelve thousand square inches on a solid form with ink at one-thousandth of an inch in thickness or film depth. For example, one-thousandth of an inch film depth is contained one thousand times in one cubic inch, and this would give one thousand square inches of coverage. Thus, the number of cubic inches contained in a can in order to carry out the object of this invention, is as important as the number of avoirdupois ounces contained in a can as used in the practice of merchandizing inks or paints heretofore. This combination of the cubic inch contents of a can and the ink film coverage expressed in ten-thousandths of an inch, changes the consideration of the bulk content of a can of ink now in terms of specific gravity equivalence, into a simple mathematical and mechanical evaluation easily understood by the printer and thereby representative as to the contents and value of coverage. Thereby intelligent guidance of ink purchases by the user and ink sales by the supplier, is provided. It is clear that quite an exact coverage can be indicated on the label of the can.

In carrying out my invention, I provide a container of a given base, round or square, the multiple of such base will give the cubic-inch contents of the container preferably in even numbers. In accordance with my invention, a label is provided having thereon a system of marking comprising the cubic-inch content of the container in avoirdupois weight and the various coverages at different film thicknesses. This system of marking may of course be applied to any container after its cubic-inch content has been calculated and determined upon.

My invention also comprises a method of ascertaining the coverage of inks or the like by taking a certain pre-determined cubical content of ink, then applying the ink in film layers of known thicknesses, and selecting the desired thickness whereby the square inch coverage of the contents of that selected can be determined.

The nature of the invention, its general principles and objects above referred to will be more fully described with reference to the examples illustrated in the accompanying drawing in which.

Similar characters of reference indicate the various parts throughout the various views.

Figure 1:
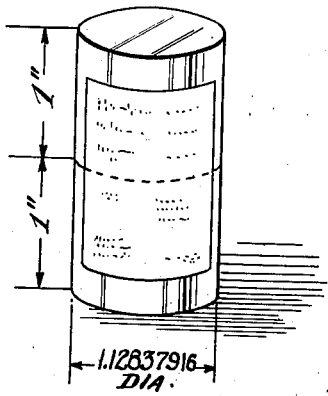
Figure 1 shows a perspective view of a container of ink having a label thereon, in accordance with my novel system of marking.

In Figure 1 my improved system of marking the container is indicated in general. A label in accordance with my invention and novel system of marking would have printed thereon the contents in pounds avoirdupois or denominations thereof, the contents in cubic inches, and the ink coverage at different film thicknesses substantially as follows:

Contents —— lbs. —— cubic inches

Ink coverage for solid form

Figure 2:
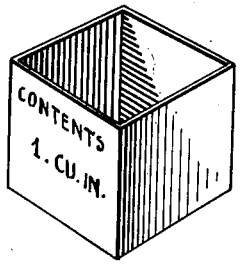
Figure 2 is a perspective view of a square container of one cubic-inch content.

Film thickness: .0001 inch ——M square inches
.0002 inch ——M square inches
.0003 inch ——M square inches
.0004 inch ——M square inches
.0005 inch ——M square inches
.0006 inch ——M square inches
.0007 inch ——M square inches
.0008 inch ——M square inches
.0009 inch ——M square inches
.001 inch ——M square inches
.0011 inch ——M square inches For the purpose of making an independent test of the coverage of the contents of any container, my invention further comprises the following method and utilizes the following means: an ordinary weighing scale, a measuring device that will hold exactly one cubic inch as, for instance, such as shown in Fig. 2, and a film depth tool. The set of tools consists of a plurality of similar tools save that each has a different depth for use as a gauge.

The measuring device can be round or square, as long as its contents is one cubic inch. The film depth tool comprises a set of ink-testing blocks, having each a different depth in the center of the block, extending from one-ten-thousandth of an inch and increasing in multiples of five-hundred-thousandths of an inch. Instead of a set of such blocks, one test block can be used having an adjustment thereon operating in increases of ten-one-thousandths of an inch. This increase is sufficient depth to make different films commensurate with ink requirements for printing purposes.

Figure 3:
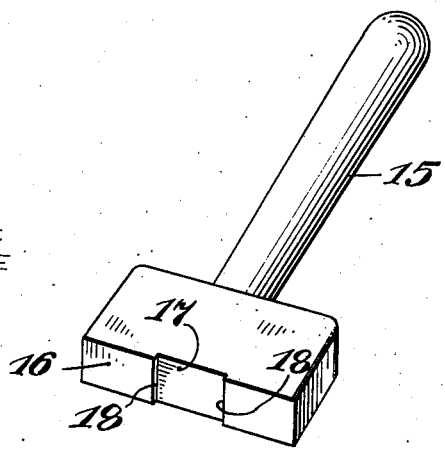
Figure 3 shows a perspective view of one of the test blocks.

In Figure 3, is shown one of the set of test blocks, the one shown having a depth gauge of one-thousandth of an inch, and consists of a handle 15, having a free end 16 acting to spread ink in the nature of a spatula, in which the gauge depth 17 is cut out; the two remaining shoulders or extensions 18, acting directly upon the paper when pressure is applied, allowing a film or depth of ink of one-thousandth of an inch to be formed through the open gauge 17, between the extensions 18.

Figure 4:
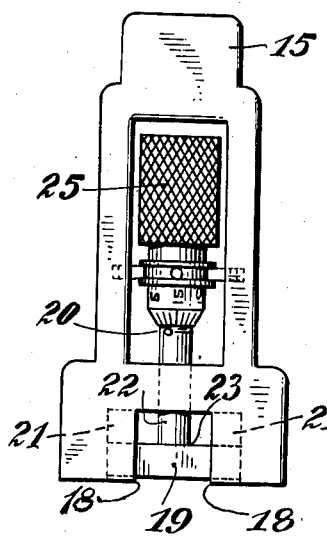
Figure 4 shows a perspective view of a modified form thereof, enabling one tool to be adjusted to different film depths.

In Figure 4 is shown in elevation a gauge member substantially as shown in Fig. 3, excepting that a variable gauge is provided. The handle and two extensions are the same as shown in Fig. 3, but the gauge member 19 is adapted to be moved step by step at distances of ten-thousandths of an inch, the scale 20 indicating the amount of movement of the gauge member 19 or the thickness of the film. The gauge member is guided in guideways 21. Upon the gauge member 19 is a rod 22, and the end of said rod 22 is secured at 23 to the member 19. Within the handle a known measuring device is applied. By turning knurled handle 25, the gauge member 19 is moved to the desired opening and the size of the opening may be read off. This enables one tool to do the work of a set of tools each having a different depth.

Figure 5:
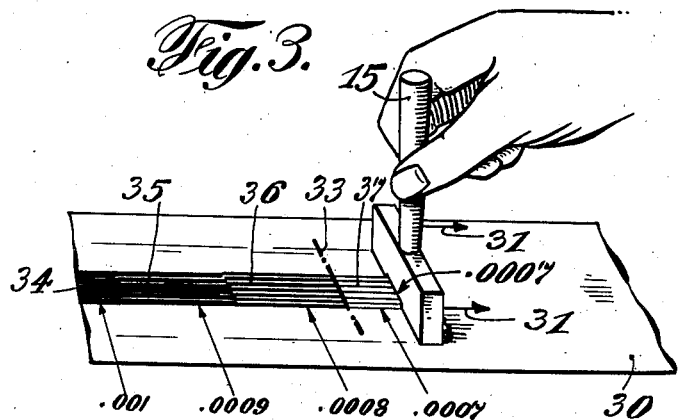
Figure 5 shows the manner in which the tool is used to determine the depth of a film.

In Figure 5 is shown a surface of paper or glass indicated by the reference character 30. The tool is held by handle 15 and the gauge of the tool is .0007 inch in depth corresponding to a thickness of the wet ink panel 37, and is moved in the direction of the arrow 31 from line 33 to the end of the panel of ink. It will be observed that other panels of ink are shown, for instance, one indicated by the reference character 34 as .001 inch in thickness, another by 35 of .0009 inch thickness, and another by 36 .0008 thickness. For each of these thicknesses a different test block is used, each of a depth of the thickness of the wet ink. Obviously, the composite test block with adjustments of a micrometer can be used.

Figure 6:
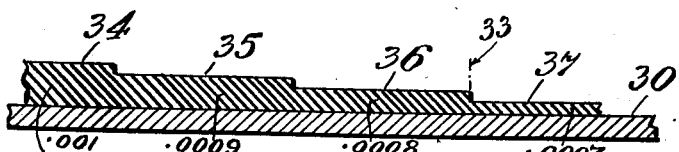
Figure 6 is a longitudinal section of the plate 30 with panels of ink thereon, in exaggerated form.

Figure 6 shows a more detailed description of the plate 30.

The operation is as follows: A small amount of ink is applied to a flat surface. Either the single test block or the composite test block is taken and applied to the ink on the surface by drawing the test block across the surface and simultaneously forcing the ink through the gauge opening. This operation is repeated with different test blocks, or with the composite test block set at different scale points until a desirable film is obtained. Then the gauge depth of the tool is read and the square inch coverage of ink can then be determined. The square inch coverage of ink per pound is indicated by the thickness of the film and the number of cubic inches of ink contained in one pound avoirdupois. This is ascertained by filling with ink the measuring device containing one cubic inch. It is then placed on the scale to find out the weight of one cubic inch of ink, and the obtained weight is then divided into one pound (avoirdupois) to ascertain the number of cubic inches per pound. If, for instance, an ink film of one-thousandth of an inch in thickness is acceptable in the test and said measuring device indicates the weight of one cubic inch coverage to one pound of ink at one-thousandth of an inch in thickness, then 1,000 square inches of solid printing form or surface covering distinctive from type printing form, can be covered. This is so because upon testing a given color of ink printed in a solid surface form to a color match and finding these two colors identical, the thickness of the solid printing form or surface can then be easily determined by a test block, such as shown in Figs. 3, 4, or 5. To ascertain the number of pounds of ink required to print said color of ink in solid printing form or surface covering of 1,000 square inches of ink form, one simply divides the measurement of the thickness of the film expressed in thousandths of an inch considered as a square inch one thousandth of an inch thick into the number of square inches of the ink form. The number of such square inches one thousandth of an inch thick results in one cubic inch. As this unit of measurement is used as a standard in the process, as shown in Fig. 2, the same when filled with ink of the consistency to make that before described color identity, will weigh one pound.

The method just described can be used to test the contents of the labeled container hereinbefore described to ascertain, if so desired, the correctness of the system of labeling, but as is obvious the system of marking on the label is intended to do away with such separate tests.

The method described will determine the amount of printing ink required for a given size solid or type form area, for a given kind of paper stock for a given color of ink.

On type forms, the amount of ink required will be indicated by the ratio of the area of the paper covered by type, using as a basis a solid form which would be indicated in the test block film of ink. On halftone plates of 50% density, meaning 50% of the plate to be white paper and 50% of the plate to be printed in ink, the coverage would be double the amount indicated in the solid block test.

This method of determining the thickness of the film of ink, as hereinbefore described, is applicable to tests made prior to the job going to the press, in that a trial sheet of a strip of ink of a certain color and thickness is first used to determine the measurement. This trial sheet may be used as a guide for the pressman in carrying the proper color selected for the job throughout the completion of the job. By contrasting the colors of the job with the color on this trial sheet, the ink consumption is controlled, since color is determinative of the thickness of the ink.

The method of determining the thickness of a film of ink may be further used for the purpose of testing the drying qualities of the film of ink by pulling the test proofs of the ink and timing the hours necessary for complete drying of said film. This factor may be used as a guide for production schedule especially if the job is to be handled in such manner as to run the sheets again through the press within a specified number of clock hours. In other words, by the trial test sheet of proper color and thickness, the drying time can be determined with accuracy and the second printing proceeded with only after the necessary time element essential for drying has expired.

This method of testing color value of a given thickness of ink is also applicable to special kinds and colors of paper. It will show the covering capacity of the ink itself especially as to the translucent and opaque qualities of ink. This test is very valuable in production of printing colored paper stock because of the fact that the color of the paper stock affects the finished color of the ink film if and when said ink film permits the color of the paper stock to change the color of the finished impression. By first producing the test trial sheet it can be used as a gauge in the further progress of the work, in addition to acting as a base for the calculation described herein.

The system of marking on the label the necessary indicia and affixing the label to a container, will give all the information in regards to ink film thickness for a given coverage, for the total number of cubic inches per pound of ink, for the number of cubic inches contained in the container, for the pounds of ink contained in the container without the use of the scale or the measuring tool. It will give the number of pounds of ink in a given number of cubic inches; it will give the number of cubic inches in a given number of pounds; it will give the printer the opportunity of testing any of his contemplated inks for future use for setting qualities; it will give him the opportunity to test his ink for color for superimposed ink jobs without the necessity for putting them on the press; it will enable him to test for indications of bleed (penetration of paper by ink); it will give the printer the opportunity to test paper for acceptability of ink to be used for the job without the necessity of putting the job on the press; it will enable him to test opaque qualities of ink on colored paper stock for ink to be used on a given job without the necessity of going to press; and finally, will give the same opportunity for the lithographic method of printing, as claimed in all previous advantages for the relief printing industry, and will give the intaglio printing industry the same advantages as for the relief printing industry.

In the foregoing, particular reference has been made to ink, but the invention is equally applicable to paints, and especially to the silk screen or paint screen method of printing.

I have described several embodiments of my invention, but it will be clear that changes may be made within the principle of the invention described, without departing from the scope of the subjoined claims.

I claim:

1. The method of ascertaining the coverage of printing ink, which consists in taking a sample of the ink, applying the ink without pressure in separated film layers, each of different and determinable thickness on a trial sheet, selecting the desired thickness according to color and coverage, and determining the square inch coverage of the selected thickness of ink by dividing the amount of film thickness into a unit of cubical contents of the ink.

2. The method of ascertaining the coverage of printing ink which consists in taking a sample of the ink, then applying the ink without pressure in separated film layers, each of different and determinable thickness, on a trial sheet, selecting the desired thickness according to color and coverage, and determining the square inch coverage of the selected thickness of ink in weight value by calculations depending upon dividing the amount of film thickness into a unit of ink in cubic measure of known weight.

FRED W. HOCH.